United States Patent
Zhan

(10) Patent No.: US 7,848,103 B2
(45) Date of Patent: Dec. 7, 2010

(54) COMPUTER ENCLOSURE

(75) Inventor: Zi-Yu Zhan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 94 days.

(21) Appl. No.: 12/432,715

(22) Filed: Apr. 29, 2009

(65) Prior Publication Data
US 2010/0259887 A1    Oct. 14, 2010

(30) Foreign Application Priority Data
Apr. 13, 2009   (CN)   .......................... 2009 1 0301506

(51) Int. Cl.
H05K 7/20 (2006.01)
F25B 21/01 (2006.01)
G05D 23/30 (2006.01)

(52) U.S. Cl. .................. 361/695; 62/3.2; 62/259.2; 361/694; 454/184

(58) Field of Classification Search .................. None
See application file for complete search history.

(56) References Cited

U.S. PATENT DOCUMENTS

| | | | | |
|---|---|---|---|---|
| 5,987,890 | A * | 11/1999 | Chiu et al. | 62/3.2 |
| 6,236,810 | B1 * | 5/2001 | Kadotani | 392/485 |
| 6,525,934 | B1 * | 2/2003 | Nakanishi et al. | 361/679.47 |
| 7,170,000 | B2 * | 1/2007 | Maeda et al. | 136/203 |
| 2005/0141197 | A1 * | 6/2005 | Erturk et al. | 361/700 |
| 2007/0035928 | A1 * | 2/2007 | Hamman | 361/701 |
| 2009/0021908 | A1 * | 1/2009 | Patel et al. | 361/688 |
| 2009/0175003 | A1 * | 7/2009 | Ali et al. | 361/695 |
| 2009/0244472 | A1 * | 10/2009 | Dunn | 349/161 |
| 2010/0050658 | A1 * | 3/2010 | Ali | 62/3.2 |

* cited by examiner

*Primary Examiner*—Gregory D Thompson
(74) *Attorney, Agent, or Firm*—Zhigang Ma

(57) ABSTRACT

A computer enclosure includes an absorber plate, a thermoelectric converter, and a refrigerator. The absorber plate is arranged in the computer enclosure to absorb heat generated in the computer enclosure. The thermoelectric converter is arranged in the computer enclosure to receive heat absorbed by the absorber plate, and then convert the absorbed heat to electrical energy. The refrigerator is arranged in the computer enclosure to receive the electrical energy generated by the thermoelectric converter, and then work to generate cold air to dissipating heat in the computer enclosure.

11 Claims, 4 Drawing Sheets

COMPUTER ENCLOSURE

BACKGROUND

1. Technical Field

The present disclosure relates to a computer enclosure.

2. Description of Related Art

In electronic devices, and particularly, computers, heat-generating components, such as central processing units (CPUs), usually generate heat during operation. Generally, a heat sink is mounted on a heat-generating component to dissipate the heat. However, very often, a heat sink for such a heat-generating component cannot fully satisfy the need for dissipating heat when the heat-generating component works in a highly loaded process or a high frequency mode.

DETAILED DESCRIPTION

Figure 1:
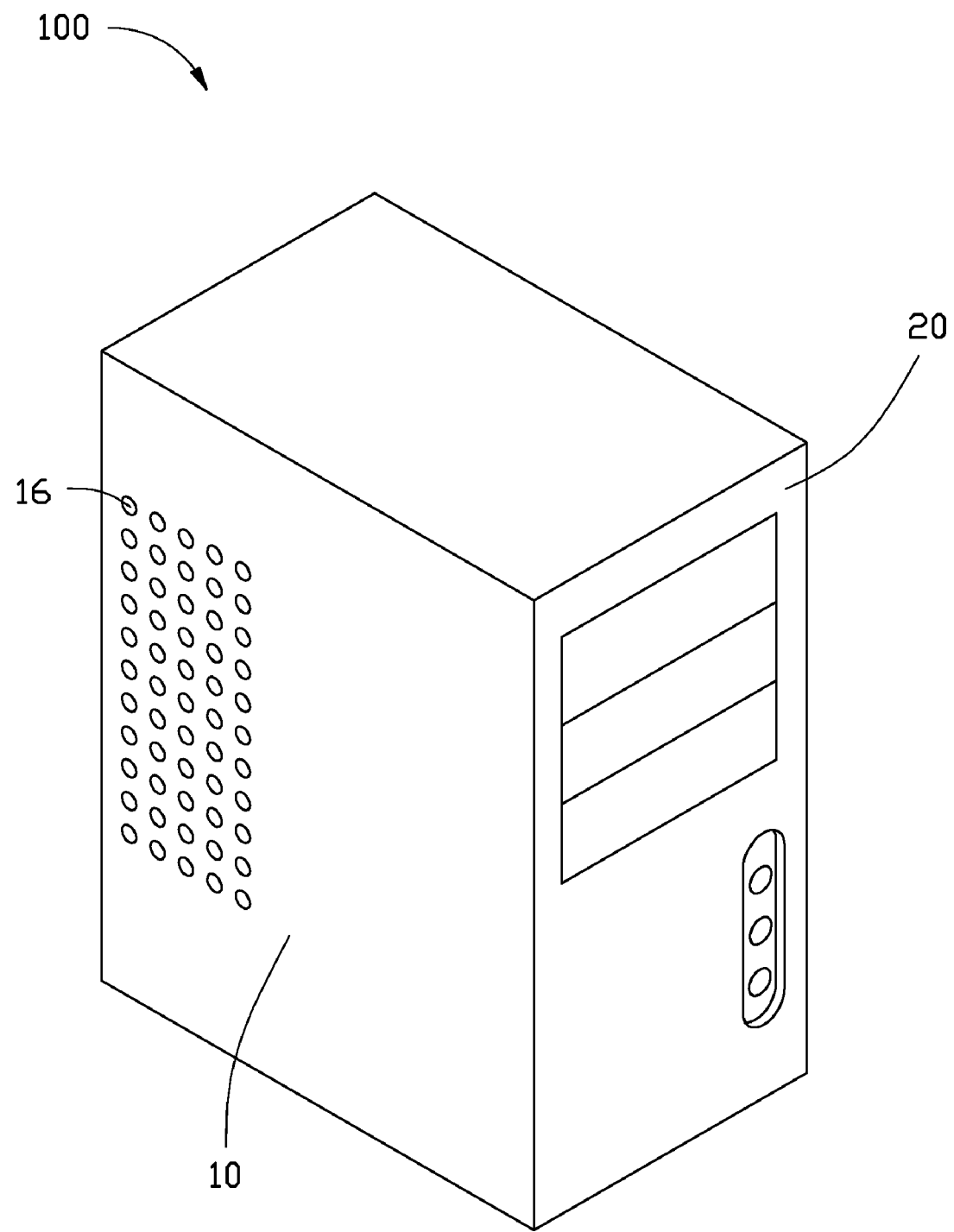
FIG. 1 is a schematic, isometric view of an exemplary embodiment of a computer enclosure, the computer enclosure including a side plate and a front plate.
Figure 2:
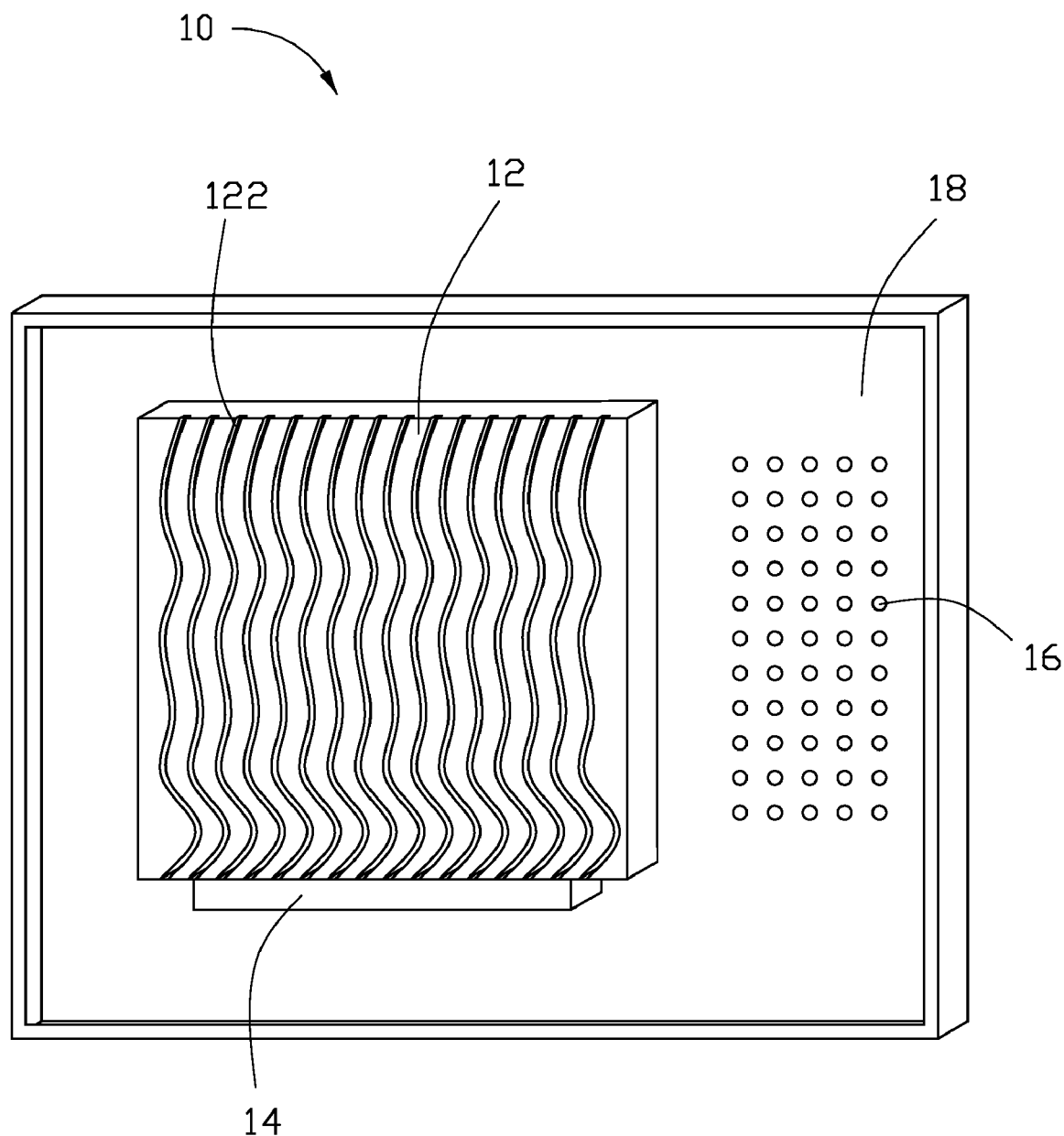
FIG. 2 is a schematic, isometric view of the side plate of the computer enclosure of FIG. 1, but viewed from another perspective.
Figure 3:
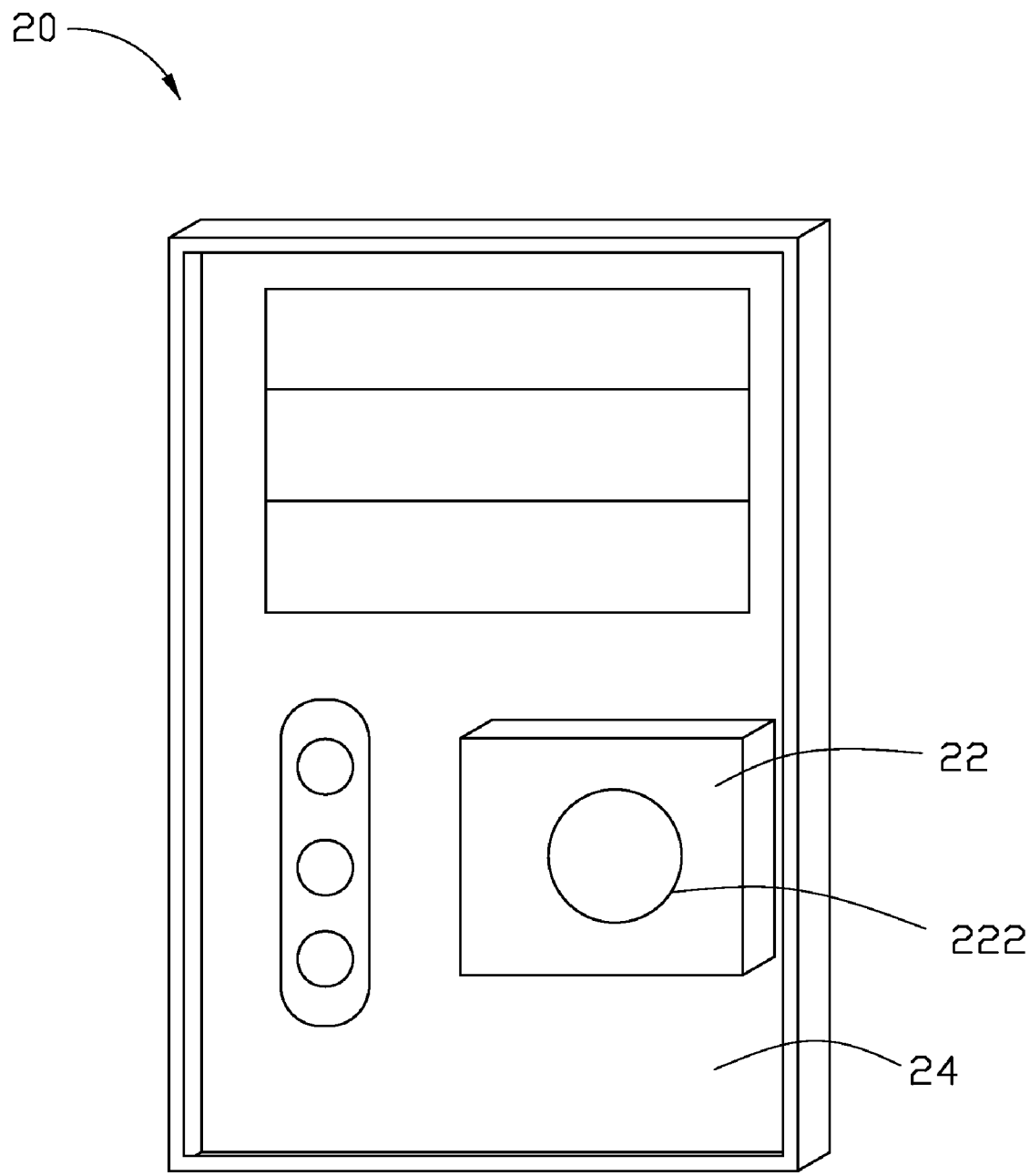
FIG. 3 is a schematic, isometric view of an exemplary embodiment of the front plate of the computer enclosure of FIG. 1, but viewed from another perspective.

Referring to FIG. 1 to FIG. 3, an exemplary embodiment of a computer enclosure 100 includes a side plate 10 and a front plate 20, the side plate 10 defining a plurality of through holes 16 to dissipate heat in the computer enclosure 100.

An absorber plate 12 is mounted to an inner wall 18 of the side plate 10 of the computer enclosure 100, to absorb heat from some electrical elements (such as a central processing unit, not shown) arranged in the computer enclosure 100. A thermoelectric converter 14 is mounted to the inner wall 18 of the side plate 10 of the computer enclosure 100 in contact with the absorber plate 12, to receive heat energy absorbed by the absorber plate 12, and then convert the heat energy to electrical energy. In one embodiment, the absorber plate 12 is rectangular, and a plurality of wavy parallel grooves 122 defined in the absorber plate 12, to improve heat absorbing efficiency.

A cryostat 22 is mounted to an inner wall 24 of the front plate 20 of the computer enclosure 100. The cryostat 22 receives the electrical energy generated by the thermoelectric converter 14, and then to work to generate cold air and output the cold air via an air outlet 222 defined in the cryostat 22. The cold air can dissipate heat from the electrical elements in the computer enclosure 100.

Figure 4:
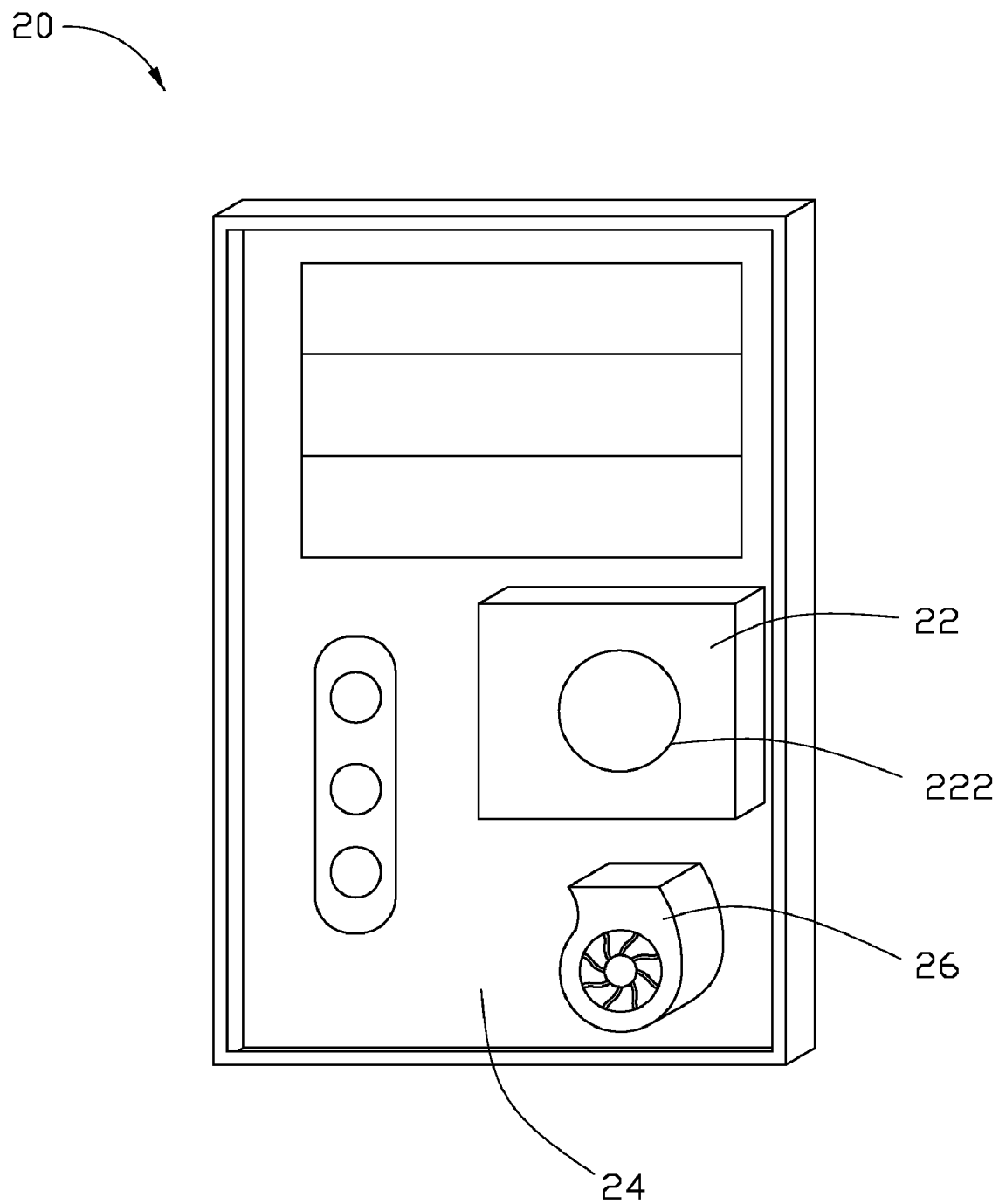
FIG. 4 is a schematic, isometric view of another exemplary embodiment of the front plate of the computer enclosure of FIG. 1.

Referring to FIG. 4, another exemplary embodiment of the front plate 20 of the computer enclosure 100 is shown. The front plate 20 is similar to the front plate 20 of the above-mentioned embodiment, except that a blower 26 is mounded to the inner wall 24 of the front plate 20, adjacent to the cryostat 22. The blower 26 can receive the electrical energy generated by the thermoelectric converter 14 to improve airflow, namely the cold air generated from the air outlet 222 of the cryostat 22 can effectively flow in the computer enclosure 100 to further improve heat dissipating efficiency.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A computer enclosure, comprising:
an absorber plate arranged in the computer enclosure, operable to absorb heat generated in the computer enclosure;
a thermoelectric converter arranged in the computer enclosure, operable to receive heat absorbed by the absorber plate and then convert the absorbed heat to electrical energy; and
a cryostat arranged in the computer enclosure, operable to receive the electrical energy generated by the thermoelectric converter and then work to generate cold air to dissipating heat in the computer enclosure.

2. The computer enclosure of claim 1, further comprising a side plate partially enclosing the absorber plate, the thermoelectric converter, and the cryostat, wherein the absorber plate is rectangular and mounted to an inner wall of the side plate.

3. The computer enclosure of claim 2, wherein a plurality of wavy parallel grooves are defined in the absorber plate, opposite to the side plate.

4. The computer enclosure of claim 2, wherein the thermoelectric converter is mounted on the inner wall of the side plate of the computer enclosure, and in contact with the absorber plate.

5. The computer enclosure of claim 2, wherein a plurality of through holes are defined in the side plate of the computer enclosure, to dissipate heat for the computer enclosure.

6. The computer enclosure of claim 1, wherein an air outlet is defined in the cryostat, to output the cold air.

7. The computer enclosure of claim 6, wherein a blower is arranged in the computer enclosure to improve air flow of the cold air.

8. The computer enclosure of claim 7, wherein the blower is arranged adjacent to the cryostat.

9. The computer enclosure of claim 7, wherein the blower receives the electrical energy generated by the thermoelectric converter to work.

10. The computer enclosure of claim 7, further comprising a front plate partially enclosing the absorber plate, the thermoelectric converter, and the cryostat, wherein the cryostat is mounted to an inner wall of the front plate.

11. The computer enclosure of claim 10, wherein the blower is mounted to the inner wall of the front plate.

* * * * *